United States Patent [19]

Sutera

[11] Patent Number: 4,639,737

[45] Date of Patent: Jan. 27, 1987

[54] TENSIONABLE ELECTRODES FOR CHARGING AND/OR DEFLECTING FLUID DROPLETS IN FLUID-JET MARKING APPARATUS

[75] Inventor: Richard Sutera, Hauppauge, N.Y.

[73] Assignee: Burlington Industries, Inc., Greensboro, N.C.

[21] Appl. No.: 786,124

[22] Filed: Oct. 10, 1985

[51] Int. Cl.[4] .............................................. G01D 15/18

[52] U.S. Cl. .............................................. 346/75

[58] Field of Search .............................................. 346/75

[56] References Cited

U.S. PATENT DOCUMENTS

| | | | |
|---|---|---|---|
| 3,373,437 | 3/1968 | Sweet et al. | 346/75 |
| 3,560,988 | 2/1971 | Krick | 346/1.1 |
| 3,579,721 | 5/1971 | Kaltenbach | 264/9 |
| 3,596,275 | 7/1971 | Sweet | 346/1.1 |
| 3,701,476 | 10/1972 | Houser | 239/102 X |
| 3,701,997 | 10/1972 | Mathis | 346/75 |
| 3,739,393 | 6/1973 | Lyon et al. | 346/1.1 |
| 3,787,883 | 1/1974 | Cassill | 346/75 |
| 3,805,273 | 4/1974 | Brady et al. | 346/75 |
| 3,813,675 | 5/1974 | Steffy et al. | 346/75 |
| 3,836,913 | 9/1974 | Burnett et al. | 346/75 |
| 4,031,563 | 6/1977 | Paranjpe et al. | 346/75 |
| 4,081,804 | 3/1978 | Van Breemen et al. | 346/75 |
| 4,085,409 | 4/1978 | Paranjpe | 346/75 |
| 4,119,973 | 10/1978 | Stager | 346/75 |
| 4,229,748 | 10/1980 | Williams et al. | 346/75 |
| 4,234,884 | 11/1980 | Vedder | 346/75 |
| 4,245,266 | 1/1981 | Paranjpe et al. | 346/75 |

*Primary Examiner*—E. A. Goldberg
*Assistant Examiner*—Gerald E. Preston
*Attorney, Agent, or Firm*—Nixon & Vanderhye

[57] ABSTRACT

An electrode for use in a fluid jet marking apparatus includes a flexible and tensionable electrode member mounted in confronting, substantially parallel alignment to a linear array of fluid droplet streams. The mounting of the flexible and tensionable electrode member is accomplished by a pair of mounting arms in spaced-apart relationship, one of the arms being pivotal while the other arm is immovable. The one pivotal arm is thus displaced relative to the other immovable arm so as to responsively tension the electrode member therebetween.

In order to increase the vibrational frequency of the flexible and tensionable electrode member and/or to substantially decrease the vibrational amplitude thereof, at least one intermediate arm having a terminal end in operative contact with the electrode member is provided. The contact of the terminal end of the intermediate arm occurs at least one location along the electrode member between the pair of spaced-apart mounting arm members and thus essentially shortens the "free length" of the electrode member so that vibrational frequency of the electrode member is substantially increased thereby responsively substantially decreasing the vibrational amplitude of the electrode member towards and away from the droplet streams. In such a manner, the electrode member can be closely positioned laterally of the droplet streams.

24 Claims, 7 Drawing Figures

TENSIONABLE ELECTRODES FOR CHARGING AND/OR DEFLECTING FLUID DROPLETS IN FLUID-JET MARKING APPARATUS

FIELD OF INVENTION

The present invention relates to the field of non-contact fluid marking devices which are commonly known as "ink-jet" or "fluid-jet" marking apparatus. More particularly, the present invention is directed to novel electrodes useful for charging and/or deflecting selected drops in a stream of droplets so as to selectively control the charging and/or deflection, respectively, of the droplets to effect marking upon a substrate.

BACKGROUND AND SUMMARY OF PRESENT INVENTION

Fluid-jet devices in and of themselves are well known through e.g. U.S. Pat. Nos. 3,373,437 to Sweet et al, 3,560,988 to Krick; 3,579,721 to Kaltenbach; and 3,596,275 to Sweet. Typically, prior art fluid-jet devices provide a linear array of fluid-jet orifices formed in an orifice plate from which filaments or streams of pressurized marking fluid (e.g. ink, dye, etc.) are caused to issue from a fluid supply chamber. Individually controllable electrostatic charging electrodes are disposed downstream of the orifice plate along the so-called "drop-formation" zone. In accordance with known principles of electrostatic induction, each fluid filament is caused to assume an electrical potential opposite in polarity and related in magnitude to the electrical potential of its respective charging electrode. When a droplet of fluid is separated from the filament, this induced electrostatic potential is then trapped on and in the droplet in the form of an electrical charge. Thus, subsequent passage of the charged droplet through an electrostatic field will cause the droplet to be deflected towards a catching structure. Uncharged droplets on the other hand proceed along the normal droplet flight path and are eventually deposited upon a recording substrate.

Recently it has been proposed to utilize fluid-jet apparatus as a means to print patterns or the like on textile materials, attention being directed to commonly-owned U.S. Pat. No. 4,523,202 which is expressly incorporated hereinto by reference. In order to achieve fine printing of patterns on a textile substrate, it is necessary to utilize an orifice plate having at least one linear array of very small orifices sized in the range of, for example, 0.00035 to 0.020 inch diameters. As can be appreciated, such small-sized orifices will establish correspondingly small-sized droplets and thus it is necessary in order to achieve selective control over the charging and/or deflection of such droplets to place the charge and deflection electrodes as closely adjacent to the droplet streams as is structurally possible.

A problem exists, however, that during operation of the fluid-jet apparatus, structural vibrations may occur and will be evidenced by periodic vibrational displacements of the electrodes towards and away from the droplet streams. Thus, as a practical matter, the electrodes in a fluid-jet apparatus cannot be placed as closely adjacent to the fluid droplet stream as would otherwise be desired since some space must be provided between the electrode face and the droplet stream so as to compensate for the amplitude of the electrode vibration towards and away from the droplet streams. Should the electrode be placed too close to the droplet stream without providing such a compensating space, the electrode during vibration may contact the fluid droplet streams, thereby wetting the electrode surface. Such an occurrence is clearly undesirable since the charge and/or deflection functions of the electrodes would be disturbed due to short-circuiting of the electrodes by virtue of their wetted surfaces thereby deleteriously affecting charge and/or deflection control of the fluid droplets in the streams which, in turn, disadvantageously affects the resulting print quality on the substrate. It is towards a solution to the above-described problems that the present invention is directed.

The electrode structure of the present invention is preferably a flexible ribbon of an electrically-conductive material (e.g. stainless steel) which is tensioned between a pair of support arms so as to be laterally positionable substantially parallel to the linear array of fluid droplet streams issuing from the orifice plate. One surface of the electrode will thus be in confronting relationship to the droplet streams so as to charge droplets or deflect already charged droplets in the streams depending upon whether the electrode is used as a charge electrode or a deflection electrode, respectively.

In order to permit close mounting of the electrode in confronting relationship to the fluid droplet streams, one of the support arms is rigidly fixed (i.e. immovable) while a second support arm is pivotally mounted so as to be displaceable relative to the other, rigid support arm. A tensioning structure, (preferably including a force-adjustable compression spring) is operatively connected to the pivotal second support arm so as to cause pivotal displacement relative to the rigid support arm to maintain the flexible electrode under tension therebetween. The tensioning structure also serves to compensate for relaxation of the electrode (e.g. due to thermal expansion) and thus maintains the electrode under substantially constant tension between the pair of support arms.

Thus, the pivotal mounting of the second support arm of the present invention promotes laterally adjacent placement of the electrode in confronting relationship to the droplet streams. The pivotal second support arm also acts as a lever of sorts with the compression spring acting as its fulcrum so as to provide greater ease in tensioning of the electrode. These advantages are important for large cross-machine widths which the electrode of the present invention must span so as to effectively operate as a component part of a fluid-jet apparatus for printing upon textile substrates, for example.

The present invention also provides structure which contacts the electrode at at least one position along its axial length between the pair of support arms so as to substantially increase the electrode's vibrational frequency and/or to substantially decrease the electrode's vibrational amplitude. This aspect of the present invention apparently effectively shortens the so-called "free length" of the electrode so that the electrode will exhibit the highest possible frequency of vibration and thus a corresponding decrease of the amplitude of vibration towards and away from the fluid droplet streams. By shortening the free length of the electrode, the structure of the present invention apparently effectively increases the fundamental frequency of vibration of the electrode (with a resulting decrease in the electrode's vibrational amplitude) thereby allowing closer placement of the electrode to the droplet streams than would otherwise be possible without the structure of the present invention. That is, if it is assumed that vibration of the electrode in a plane parallel to the droplet streams is negligible, then the fundamental frequency of the electrode in a plane perpendicular to the droplet streams can be expressed by:

$$f = \frac{1}{2l} \sqrt{\frac{F}{\mu}},$$

where f is the fundamental frequency (cycles/sec), l is the free length of the electrode (in.), F is the tension applied to the electrode (lbs-force), and $\mu$ is the mass per unit length of the electrode (lbs-sec$^2$/in.). Accordingly, by decreasing the free length of the electrode, the fundamental frequency is increased thereby decreasing the amplitude of the electrode's vibration towards and away from the droplet streams.

Such frequency increasing/amplitude decreasing functions are provided according to an aspect of this invention by means of at least one intermediate arm having a terminal end which contacts a portion of the electrode along its axial length between the pair of support arms when the electrode is in its tensioned state. The contact between the terminal end of the intermediate arm on the one hand and the portion of the electrode on the other hand apparently establishes a vibration node and thus shortens the "free length" of the electrode by establishing at least a pair of sublengths of the electrode between the intermediate arm and each lateral support arm.

This increase of vibrational frequency which is accomplished by the intermediate arm structures of this invention is directly contrary to "damping" structures typically provided with conventional electrode assemblies. That is, conventional electrode assemblies decrease or damp the vibrational frequency of the electrode over time as an attempt to permit closer placement of the electrode to the droplet stream. The present invention seeks just the opposite result in that an increased frequency (and thus decreased amplitude) is achieved by provision of the intermediate arm structures as was briefly mentioned above.

BRIEF DESCRIPTION OF THE ACCOMPANYING DRAWINGS

Reference will be hereinafter made to the accompanying drawings wherein like reference numerals throughout the various figures denote like structural elements and wherein:

FIG. 1 is a schematic elevational view of a fluid-jet marking apparatus in which the electrode structures of the present invention are particularly well suited for use;

FIG. 1*a* is a schematic representation of a variation of the fluid-jet marking apparatus shown in FIG. 1 in which the electrode structures of this invention may also be used;

DETAILED DESCRIPTION OF THE PREFERRED EXEMPLARY EMBODIMENT

Figure 1:
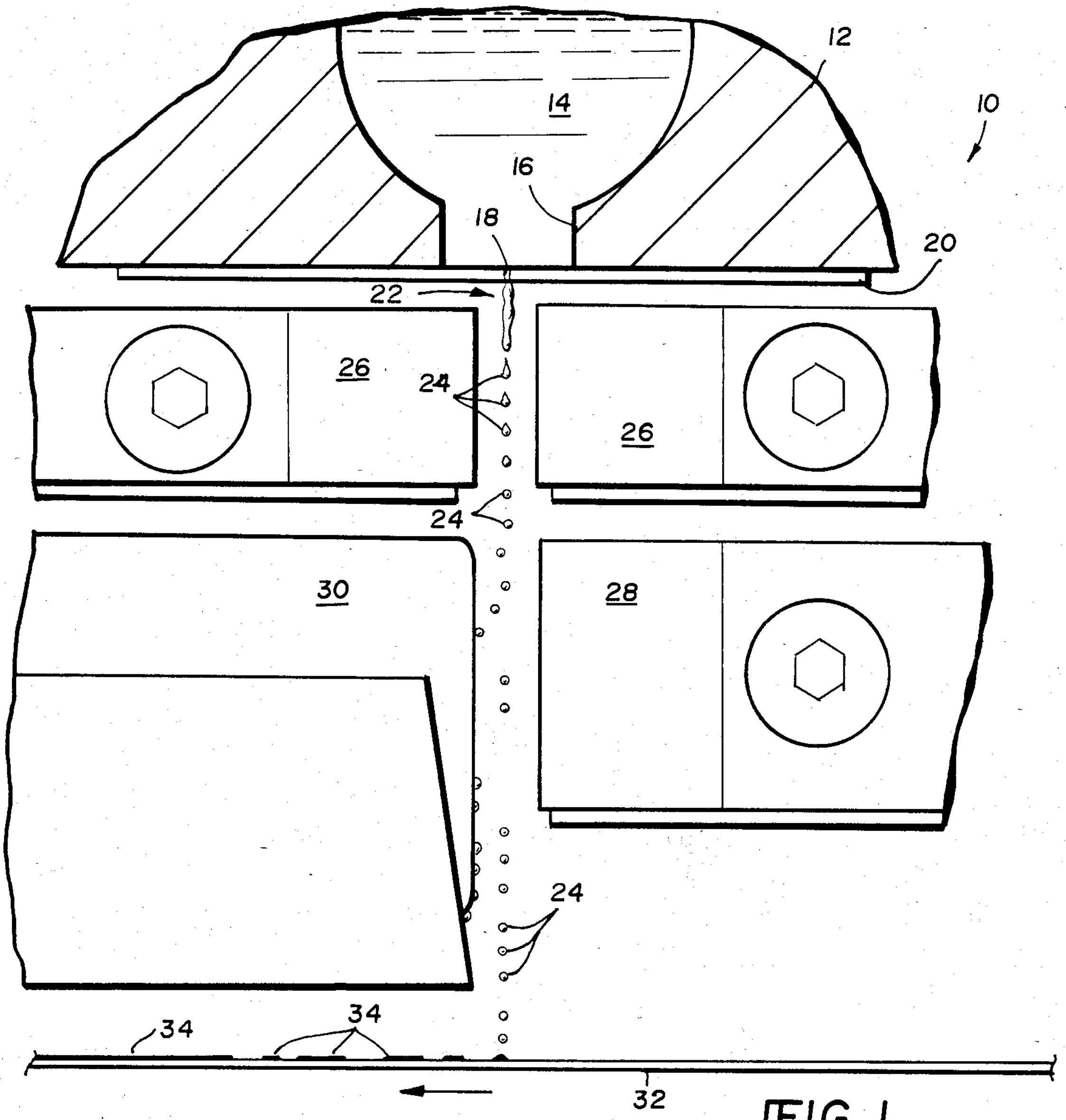

A fluid-jet marking apparatus 10 in which the present invention finds particular utility is shown in accompanying FIG. 1, the structures thereof being shown in a greatly-enlarged manner for clarity of presentation. The fluid-jet apparatus 10 generally includes a manifold assembly 12 which defines a fluid supply chamber 14. The lower end of supply chamber 14 establishes an outlet slot 16 so that fluid can pass through a linear array of orifices 18 defined in orifice plate 20. Thus, fluid filament 22 issuing from each orifice 18 is capable of forming individual droplets 24 in the droplet formation zone adjacent charge electrodes 26. During droplet formation, an electrostatic charge is placed upon selected ones of droplets 24 by means of charge electrodes 26. Charged ones of droplets 24 are then deflected by deflection electrode 28 towards catching structure 30 while uncharged ones of droplets 24 proceed on to substrate 32 so as to be deposited thereon and form indicia, pattern, solid shade coloring or the like generally represented by numeral 34.

Figure 1A:
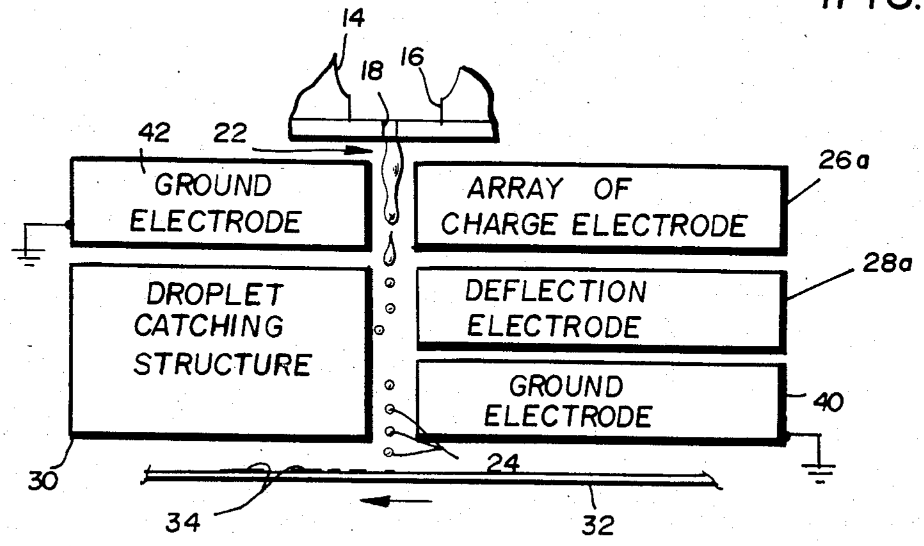

It should be understood that the desired end result of the fluid marking upon substrate 32 will determine whether the electrode of this invention is used as both a charging electrode and a deflection electrode or whether it is used as only one of the charging and deflection electrodes. Thus, the apparatus 10 is shown in FIG. 1 as employing the electrodes of this invention as both the charging electrodes 26 and the deflection electrode 28. Apparatus 10 of FIG. 1 is therefore particularly well suited for the "printing" of a uniformly applied marking fluid (i.e. "solid shade" coloring) upon substrate 32 in accordance with the techniques disclosed, for example, in commonly-owned and copending U.S. application Ser. No. 729,412 filed on May 1, 1985 in the name of Dressler et al. On the other hand, if geometric or fanciful patterns, indicia or the like are desired to be printed upon substrate 32 (i.e. "pattern printing"), then the charge electrode may take the form of an array of plural electrodes extending in the cross-machine direction (see, for example, the electrode disclosed in commonly-owned and copending U.S. application Ser. No. 736,076 filed May 20, 1985 in the name of Sutera et al) so as to more or less effect independent charge control upon the individual fluid droplet streams in which case the electrode of this invention is preferably utilized as the deflection electrode. FIG. 1*a* schematically depicts a fluid-jet marking apparatus 10*a* having an array of charge electrodes 26*a* and a deflection electrode 28*a*, the latter being an electrode in accordance with this invention. All other principal structures of apparatus 10*a* (e.g. droplet catching structure 30, orifice plate 18, etc.) can be identical to those structures referenced above with respect to apparatus 10. However, when the electrode structure of this invention is used as the deflection electrode 28*a* for the pattern printing of substrate 32, it is also preferable to employ a ground electrode 40 therebeneath in addition to employing ground electrode 42 (also preferably in accordance with the electrode structures of this invention) opposing the charge electrode array 26*a* as can be seen schematically in FIG. 1*a*.

Figure 2:
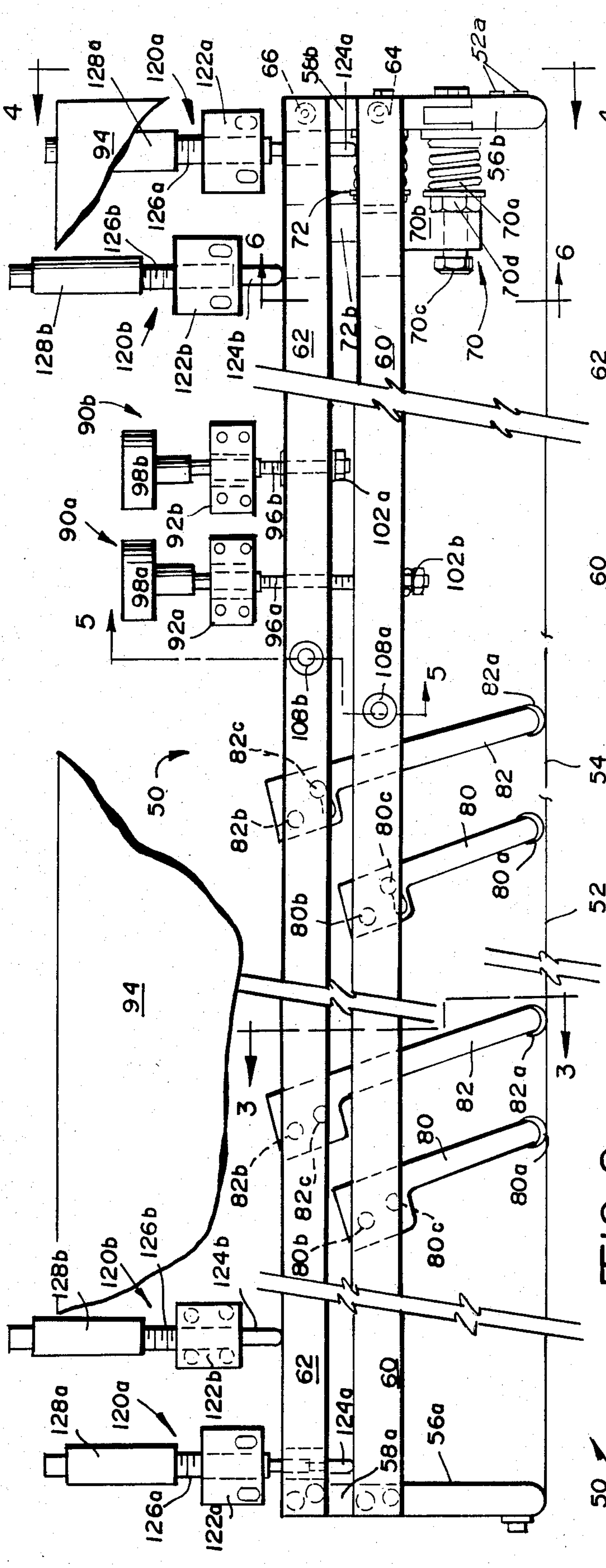
FIG. 2 is a top plan view of the electrode structures of the present invention.
Figure 3:
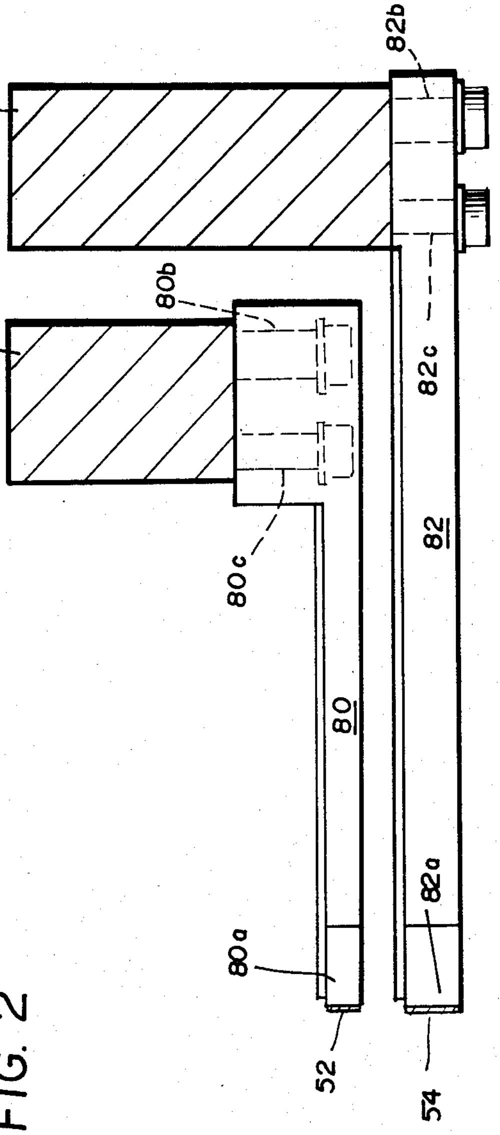
FIG. 3 is a cross-sectional elevational view of the intermediate arms of the present invention taken along line 3—3 in FIG. 2.
Figure 4:
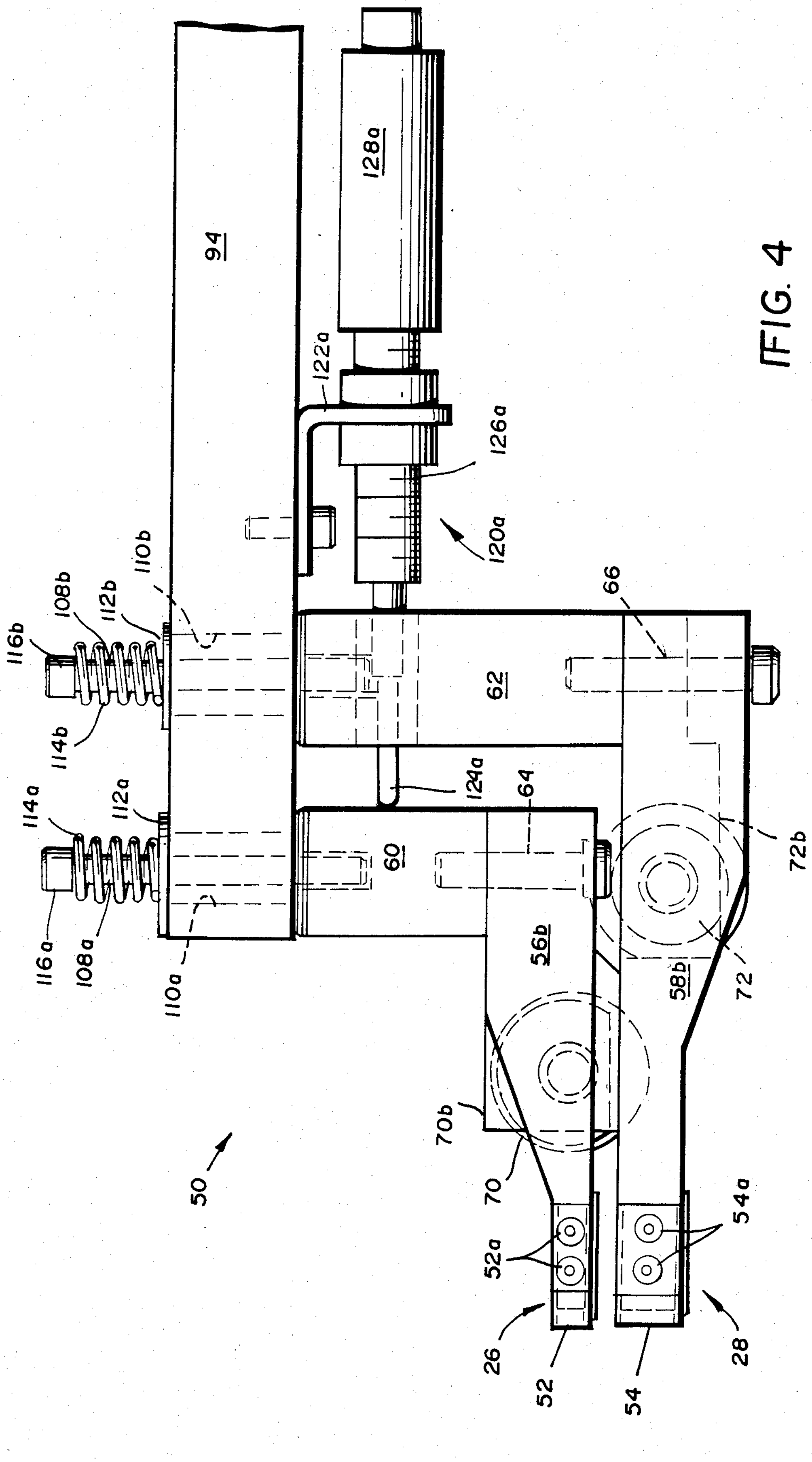
FIG. 4 is a side elevational view of the electrode structures of the present invention as viewed from line 4—4 in FIG. 2.

The electrode assembly 50 employing electrode structures of the present invention in a capacity as both the charge electrodes 26 and deflection electrode 28 will be better understood by reference to accompanying FIGS. 2–4 and the description thereof which follows. Although reference will be made to the electrode assembly 50 as comprising both one of the charge electrodes 26 and a deflection electrode 28 each in accordance with this invention, it is contemplated that the structural features of the present invention could be embodied in the fluid jet apparatus 10 as either a charge or a deflection electrode alone in dependence upon the desired printing result upon substrate 32 as was briefly mentioned above. Moreover, since the structural features of this invention relating to charge electrodes 26 are functionally similar to the structural features of deflection electrode 28, only those structures relating to charge electrodes 26 will be described below. Wherever possible, those structures of deflection electrodes 28 will, however, be parenthetically noted along with those structures of charge electrodes 26 to which they correspond. It should also be understood that both charge electrodes 26 shown in FIG. 1 are identical to (but mirror images of) one another and thus only the charge electrode 26 which is associated with deflection electrode 28 via assembly 50 will be described in detail below.

As is shown in FIGS. 2–4, charge electrode 26 (28) includes a flexible and tensionable electrode member 52 (54) tensioned between a pair of mounting arms 56*a*, 56*b* (58*a*, 58*b*). The arms 56*a*, 56*b* (58*a*, 58*b*) are themselves mounted to cross-support member 60 (62) so that the arms 56*a*, 56*b* (58*a*, 58*b*) are maintained in spaced relationship relative to one another. Arm 56*a* (58*a*) is rigidly connected to cross-support member 60 (62) so as to be immovable relative thereto while arm 56*b* (58*b*) is pivotally connected to cross-support member 60 (62) by means of pivot pin assembly 64 (66).

Tension assembly 70 (72) is operatively coupled to cross-support 60 (62) and is shown in greater detail in FIG. 2. Tension assembly 70 (72) includes a compression spring 70*a* exerting a bias force between arm 56*b* and subsupport 70*b* (72*b*). An adjusting bolt 70*c* (72*c*) and nut 70*d* are threadably engaged with one another and permit the bias force exerted upon arm 56*b* to be selectively adjustable in dependence upon selective turning movement being applied to bolt 70*c* (72*c*). Accordingly, the bias force exerted upon arm 56*b* by compression spring 70*a* forcibly urges arm 56*b* to be pivotally moved outwardly away from its opposing rigidly-fixed arm 56*a* thereby maintaining the ribbon electrode member 52 in a tensioned state between the two arms 56*a*, 56*b*. It should be understood that the ribbon electrode 54 is maintained in a tensioned state between arms 58*a*, 58*b* by means of tension assembly 72 in a like manner to that of tension assembly 70 even though its corresponding structure is not entirely shown in detail in the accompanying Figures. Thus, the tension assembly 70 (72) maintains ribbon electrode member 52 (54) in a tensioned state between arm pairs 56*a*, 56*b*, (58*a*, 58*b*) while automatically compensating for e.g. thermal relaxation of ribbon electrode member 52 (54) which may occur during usage by virtue of the outward biased displacement of pivotally mounted arm member 56*b* (58*b*) relative to its opposing immovably fixed arm 56*a* (58*a*).

Cross-support member 60 (62) includes intermediate arms 80 (82) pivotally mounted thereto. Each intermediate arm 80 (82) includes a terminal end 80*a* (82*a*) which is in operative contact with ribbon electrode member 52 (54). The intermediate arms 80 (82) are pivotally mounted to cross-support member 60 (62) by conventional bolts, pivot pins or the like generally shown by reference numeral 80*b* (82*b*). To positionally maintain the intermediate arms 80 (82) in contact with ribbon electrode member 52 (54), there is respectively provided a slot and locking bolt assembly 80*c* (82*c*) as can be seen in FIG. 2. Once intermediate arms 80 (82) have been pivotally moved so as to be in operative contact with ribbon electrode member 52 (54), the bolts 80*c* (82*c*) are tightened thereby maintaining the terminal ends 80*a* (82*a*) of arms 80, (82) in contact with electrode member 52 (54).

According to this invention at least one intermediate arm 80 (82) is provided so as to effectively shorten the "free length" of the ribbon electrode 52 (54)—that is, to establish at least first and second sublengths of ribbon electrode 52 (54) between the contact of the terminal end 80*a* (82*a*) and each of the mounting arms 56*a*, 56*b* (58*a*, 58*b*). When the electrode member 52 (54) is utilized in the printing of textile substrates, it must span the cross-machine width of the textile substrate (typically about 1.8 meters) and thus, under such circumstances, it is desirable to utilize plural intermediate arms 80 (82) as is shown in the accompanying drawings. It will be understood that when N arms 80 (82) are utilized, N+1 sublengths of ribbon electrode 52 (54) are established between adjacent ones of intermediate arms 80 (82) and between the outermost ones of intermediate arms 80 (82) and a respective one of mounting arms 56*a*, 56*b* (58*a*, 58*b*). It is preferred that the axial length dimensions of the sublengths be unequal relative to one another to more effectively prevent vibration of one sublength affecting vibration of an adjacent sublength or sublengths.

The mounting arms 56*a*, 56*b* and 58*a*, 58*b* and intermediate arms 80, 82 are each preferably formed entirely from a substantially rigid electrically-insulating material (e.g. nylon) so as to not only electrically isolate electrode member 52 and electrode member 54 from one another but also to electrically isolate each electrode member 52 and 54 from the other metal structural members comprising assembly 50. The electrode members 52, 54 can thus be connected to appropriate voltage drive sources (not shown) by means well known to those in the electrical arts, for example, by connecting leads from the appropriate voltage drive sources to mounting screws 52*a* and 54*a*, respectively.

Figure 5:
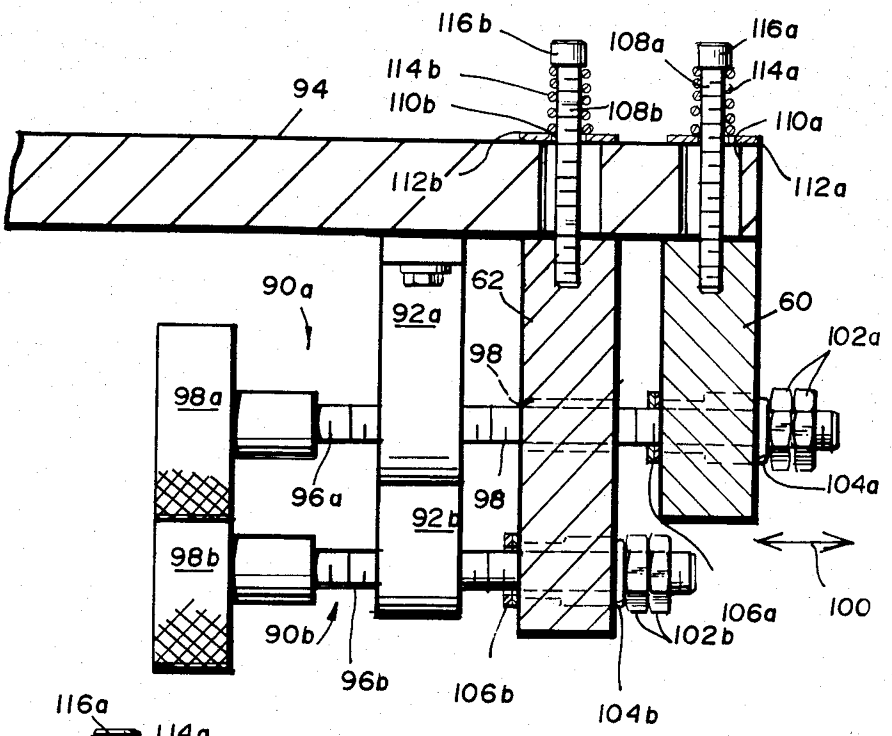
FIG. 5 is a cross-sectional elevational view taken along line 5—5 in FIG. 2 of the adjusting mechanisms of the present invention.
Figure 6:
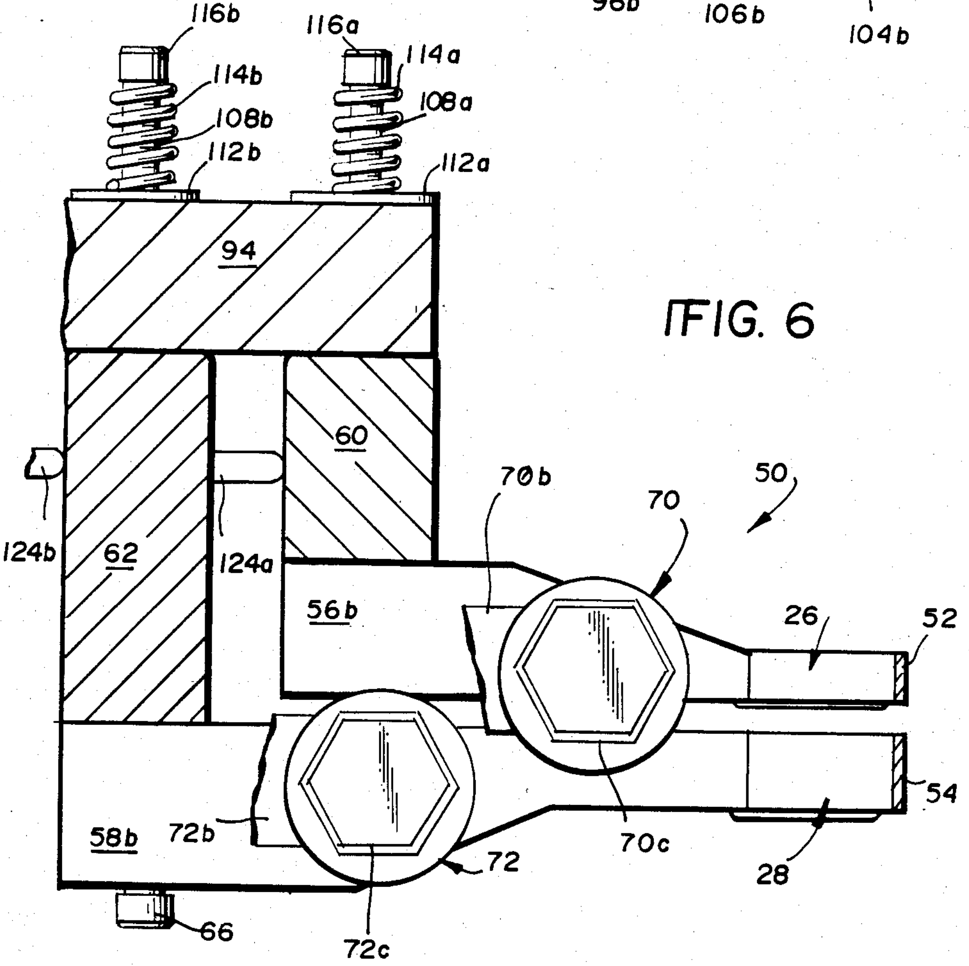
FIG. 6 is an interior elevational view taken along line 6—6 in FIG. 2 of the pivotal support arms of the mounting structures of the present invention.

Lateral positioning of electrode member 52 (54) relative to the droplet streams is accomplished according to this invention by means of a lateral adjustment assembly 90*a* (90*b*) operatively coupled to cross-support member 60 (62) as can be seen with greater clarity in FIG. 5. Adjustment assembly 90*a* (92*b*) includes a mounting bracket 92*a* (92*b*) fixed to the upper support member 94. A threaded adjustment shaft 96*a* (96*b*) is threadably coupled to bracket 92*a* (92*b*) and includes a knurled knob 98*a* (98*b*) at a rearward end thereof so that adjusting shaft 96*a* (96*b*) can be turned manually to effect displacement forwardly and rearwardly (arrow 100) of shaft 96*a* (98*b*) relative to bracket 92*a* (92*b*). The forward end of shaft 96*a* (96*b*) is coupled to cross-support 60 (62) by means of locknuts 102*a* (102*b*) and compression spring 104*a* (104*b*), the latter being biasingly compressed between locknuts 102*a* (104*a*) on the one hand and cross-support member 60 (62) on the other hand. A lock washer 106*a* (106*b*) is also provided on the rearward side of cross-support member 60 (62). The shaft 96*a* slidably passes through aperture 98 defined in cross-support 62 so that turning movement of shaft 96*a* will not affect cross-support 62.

Cross-support member 60 (62) is itself coupled to frame support 94 so as to permit movement forwardly and rearwardly relative to the droplet stream (arrow 100). To accomplish this, a bolt 108*a* (108*b*) is threadably coupled to cross-support member 60 (62) and is slidably received within slot 110*a* (110*b*) defined in frame support 94. A washer 112*a* (112*b*) provides a bearing surface against which the bias force of compression spring 114*a* (114*b*) can be exerted, the compression spring 114*a* (114*b*) being disposed between head 116*a* (116*b*) of bolt 108*a* (108*b*) and washer 112*a* (112*b*). Accordingly, bolts 108*a* (108*b*) can be slightly loosened to permit slidable movement of cross-support member 60 (62) relative to frame support 94 in the direction of arrow 100 in response to turning movement being manually applied to knob 98*a* (98*b*). In such a manner, cross-support member 60 (62) is selectively moved forwardly or rearwardly relative to the droplet streams also in the direction of arrow 100. Preferably, a plurality of the bolt/spring assemblies 108*a*/110*a* (108*b*/110*b*) are disposed axially along the length of cross-support member 60 (62).

A pair of calibrators 120*a* (120*b*) are preferably provided in operative contact with cross-support number 60 as can be seen more clearly in FIG. 2. Calibrator 120*a* (120*b*) (see FIG. 4) is fixed to frame support 94 by means of L-shaped bracket 122*a* (122*b*) so that calibrator 120*a* (120*b*) is disposed rearwardly of cross-support member 60 (62). Calibrator 120*a* (120*b*) includes a feeler arm 124*a* (124*b*) in contact with cross-support member 60 (62) and a vernier scale 126*a* (126*b*). A biasing spring (not shown) housed within cylinder 128*a* (128*b*) biases vernier scale 126*a* and thus feeler arm 124*a* (124*b*) so as to maintain contact between cross-support member 60 (62) and feeler arm 124*a* (124*b*). As such, when lateral adjustment of cross-support member 60 (62) is effected by means of turning movement being applied to knob 98*a* (98*b*), the amount of movement can be visually determined by reference to vernier scale 126*a* (126*b*) in contact with cross-support member 60 (62). Correct alignment and placement of electrode member 52 (54) relative to the droplet stream is thereby insured. Once the correct positioning and alignment of electrode member 52 (54) is achieved, bolts 108*a* (108*b*) are threadably tightened so as to maintain cross-support member 60 (62) in its properly aligned position.

As will be apparent, the present invention may take the form of various modifications to the presently preferred exemplary embodiment disclosed herein, which modifications shall be accorded the broadest scope of the appended claims so as to encompass all equivalent structures, assemblies and/or devices.

What is claimed is:

1. An electrode for use in a fluid jet marking apparatus having means to generate at least one linear array of fluid droplet streams, means for charging selected ones of said droplets in said streams and means for electrostatically deflecting said selected charged droplets towards a catching structure, wherein said electrode comprises said means for charging and/or said means for deflecting and includes:

a flexible and tensionable electrode member; and mounting means for mounting said electrode member in confronting, substantially parallel alignment to the linear array of fluid droplet streams, said mounting means including (a) a pair of mounting arm means in spaced-apart relationship, said pair of mounting arm means for mounting respective end portions of said electrode member therebetween, one of said pair being rigid and the other one of said pair being pivotal, and (b) tensioning means connected to said other pivotal one of said pair of arm means for pivotally displacing said other pivotal one relative to said rigid one to responsively tension said electrode member between said pair of mounting leg means.

2. An electrode as in claim 1 further comprising frequency increasing/amplitude decreasing means in operative contact with said electrode member in at least one location therebetween for substantially increasing the vibrational frequency of said electrode member and/or for substantially decreasing the vibrational amplitude of said electrode member.

3. An electrode as in claim 2 wherein said frequency increasing/amplitude decreasing means includes at least one intermediate arm having a terminal end in operative contact with said electrode at said at least one location.

4. An electrode as in claim 3 wherein said mounting arm means includes a cross-support member to mount said pair of mounting arm means in said spaced-apart relationship, and wherein said intermediate arm includes means for coupling said intermediate arm to said cross-support member to positionally adjust said terminal end relative to said electrode member and for maintaining said operative contact between said terminal end and said electrode member once said intermediate arm has been positionally adjusted.

5. An electrode as in claim 1 further comprising lateral adjustment means for positionally adjusting said mounting means and thus said electrode member laterally of said droplet streams.

6. An electrode as in claim 5 wherein said adjustment means includes scale means for visually indicating the extent of lateral adjustment of said electrode member.

7. An electrode as in claim 6 wherein said scale means includes a feeler arm in contact with said mounting means so as to be laterally displaceable with said mounting means upon lateral adjustment thereof.

8. An electrode for use in a fluid jet marking apparatus having means to generate a linear array of fluid droplet streams, charging means for charging selected ones of said droplets in said streams, and deflection means for electrostatically deflecting said selected charge droplets towards a catching structure, wherein said electrode comprises said charging means and/or said deflection means and includes:

a flexible and tensionable elongated electrode member;

mounting means for mounting said electrode member under tension in confronting, substantially parallel alignment relative to said linear array of fluid droplets; and frequency increasing/amplitude decreasing means in operative contact with said electrode member at at least one location therealong for substantially increasing the vibrational frequency of said electrode member and/or for substantially decreasing the vibrational amplitude of said electrode member.

9. An electrode adapted to being placed laterally of a linear array of droplet streams issuing from a fluid jet marking apparatus, said electrode including:

a flexible and tensionable electrode member;

mounting means including a pair of separated mounting arms for mounting said electrode member under tension between said mounting arms; and at least one intermediate arm means having a terminal end in contact with said electrode member at at least one location along the axial length of said electrode member between said pair of mounting arms thereby for effectively establishing at least first and second sublengths of said electrode member between said one location and said pair of mounting arms.

10. An electrode as in claim 8 or 9 wherein said mounting means includes adjustment means for positionally adjusting said electrode member laterally of said droplet streams.

11. An electrode as in claim 9 used as a charging electrode in a fluid-jet marking apparatus.

12. An electrode as in claim 9 used as a deflection electrode in a fluid-jet marking apparatus.

13. A fluid jet marking apparatus including means for generating at least one linear array of fluid droplet streams, charge means for charging selected ones of said droplets, a droplet catcher for catching said charged selected ones of said droplets, and deflection means for deflecting said charged selected ones of said droplets towards said catcher, wherein said charge means and/or said deflection means includes:

a flexible and tensionable electrode member; and mounting means for mounting said electrode member in confronting, substantially parallel alignment to the linear array of fluid droplet streams, said mounting means including (a) a pair of mounting arm means in spaced-apart relationship, said pair of mounting arm means for mounting respective end portions of said electrode member therebetween, one of said pair being rigid and the other one of said pair being pivotal, and (b) tensioning means connected to said other pivotal one of said pair of mounting arm means for pivotally displacing said other pivotal one relative to said rigid one to responsively tension said electrode member between said pair of mounting arm means.

14. An electrode as in claim 13 further comprising frequency increasing/amplitude decreasing means in operative contact with said electrode member at at least one location therealong for substantially increasing the vibrational frequency of said electrode member and/or for substantially decreasing the vibrational amplitude of said electrode member.

15. An electrode as in claim 14 wherein said frequency increasing/amplitude decreasing means includes at least one intermediate arm having a terminal end in operative contact with said electrode at said at least one location.

16. An electrode as in claim 15 wherein said mounting arm means includes a cross-support member to mount said pair of mounting arm means in said spaced-apart relationship, and wherein said intermediate arm includes means for coupling said intermediate arm to said cross-support member to positionally adjust said terminal end relative to said electrode member and for maintaining said operative contact between said terminal end and said electrode member once said intermediate arm has been positionally adjusted.

17. An electrode as in claim 13 further comprising lateral adjustment means for positionally adjusting said electrode member laterally of said droplet streams.

18. An electrode as in claim 17 wherein said adjustment means includes scale means for visually indicating the extent of lateral adjustment of said electrode member.

19. A fluid jet marking apparatus including means for generating at least one linear array of fluid droplet streams, charge means for charging selected droplets in said streams, a droplet catcher for catching said charged selected droplets, and deflection means for deflecting said charged selected droplets out of a normal droplet flight path and towards said droplet catcher so that uncharged ones of said droplets proceed on to a printable medium, said charge means and/or said deflection means comprising:

an elongated flexible electrode member;

mounting means for mounting said electrode member under tension laterally of said at least one linear array of fluid droplet streams; and at least one intermediate arm means having a terminal end in contact with a portion of said electrode member at a location along its axial length, said at least one arm means for increasing vibrational frequencies of said electrode member to thereby responsively decrease vibrational amplitudes of said electrode member towards and away from said droplet streams whereby said electrode member is closely positioned laterally of said droplet streams.

20. A fluid jet marking apparatus as in claim 19 wherein said mounting means includes adjustment means for positionally adjusting said electrode member laterally of said droplet streams.

21. A fluid jet marking apparatus as in claim 20 wherein said adjustment means includes scale means for visually indicating the extent of lateral adjustment of said electrode member.

22. A fluid jet marking apparatus as in claim 19, 20, or 21 wherein said mounting means includes:

(a) a pair of mounting arm means in spaced-apart relationship, said pair of mounting arm means for mounting respective end portions of said electrode member therebetween, one of said pair being rigid and the other one of said pair being pivotal, and (b) tensioning means connected to said other pivotal one of said pair of arm means for pivotally displacing said other pivotal one relative to said rigid one to responsively tension said electrode member between said pair of mounting arm means.

23. A fluid jet marking apparatus including means for generating at least one linear array of fluid droplet streams, an array of charge electrodes for charging selected droplets in said streams, a droplet catcher for catching said charged selected droplets, and a deflection electrode for deflecting said charged selected droplets out of a normal droplet flight path and towards said droplet catcher so that uncharged ones of said droplets proceed on to a printable medium, said deflection electrode comprising:

a flexible and tensionable electrode member;

mounting means including a pair of separated mounting arms for mounting said electrode member under tension between said mounting arms; and at least one intermediate arm means having a terminal end in contact with said electrode member at at least one location along the axial length of said electrode member between said pair of mounting arms thereby for effectively establishing at least first and second sublengths of said electrode member between said one location and said pair of mounting arms.

24. A fluid jet marking apparatus as in claim 23 wherein said mounting means includes:

(a) a pair of mounting arm means in spaced-apart relationship, said pair of mounting arm means for mounting respective end portions of said electrode member therebetween, one of said pair being rigid and the other one of said pair being pivotal, and (b) tensioning means connected to said other pivotal one of said pair of arm means for pivotally displacing said other pivotal one relative to said rigid one to responsively tension said electrode member between said pair of mounting arm means.

* * * * *

UNITED STATES PATENT AND TRADEMARK OFFICE
CERTIFICATE OF CORRECTION

PATENT NO. : 4,639,737

DATED : January 27, 1987

INVENTOR(S) : Sutera

It is certified that error appears in the above-identified patent and that said Letters Patent is hereby corrected as shown below:

Column 8, line 15, delete "leg" and insert --arm; line 20, delete "therebetween" and insert --therealong--.

Signed and Sealed this

Twenty-fourth Day of May, 1988

*Attest:*

DONALD J. QUIGG

*Attesting Officer*

*Commissioner of Patents and Trademarks*